United States Patent [19]

Yang

[11] Patent Number: 4,538,646

[45] Date of Patent: Sep. 3, 1985

[54] FAUCET WITH BUILT-IN NEEDLE VALVE

[76] Inventor: Wen-Liang Yang, P.O. Box 10160, Taipei, Taiwan

[21] Appl. No.: 593,231

[22] Filed: Mar. 20, 1984

[51] Int. Cl.³ ............................................. F16K 31/58
[52] U.S. Cl. .................... 137/883; 137/886; 251/337; 251/353; 4/192
[58] Field of Search ................ 137/883, 886; 251/149.7, 337, 353; 4/619, 191, 192

[56] References Cited

U.S. PATENT DOCUMENTS

| | | | |
|---|---|---|---|
| 569,304 | 10/1896 | Slaymaker | 251/353 X |
| 604,366 | 5/1898 | Campbell | 251/149.7 X |
| 927,336 | 7/1909 | Dunmeyer | 251/149.7 |
| 1,064,105 | 6/1913 | Steitz | 251/149.7 X |
| 1,088,822 | 3/1914 | Kenney | 251/353 |
| 1,392,456 | 10/1921 | Spatter et al. | 251/353 X |
| 1,612,168 | 12/1926 | Benchenstein | 251/149.7 X |
| 3,035,617 | 5/1962 | Breitenstein | 251/149.7 X |

FOREIGN PATENT DOCUMENTS

| | | | |
|---|---|---|---|
| 2532275 | 10/1977 | Fed. Rep. of Germany | 251/149.7 |
| 545176 | 10/1922 | France | 137/614.05 |
| 877849 | 1/1943 | France | 251/353 |

*Primary Examiner*—Alan Cohan
*Assistant Examiner*—John C. Fox

[57] ABSTRACT

A faucet with built-in needle valve includes a hollow stem, a needle valve resiliently mounted in the hollow stem and a syringe movably inserted in the hollow stem so that the syringe may be depressed to open needle valve for spray water outwards directly from a faucet which is normally closed and after pulling syringe upwards, needle valve may be automatically closed to stop water spray by a restored spring resiliently backing the needle valve.

1 Claim, 3 Drawing Figures

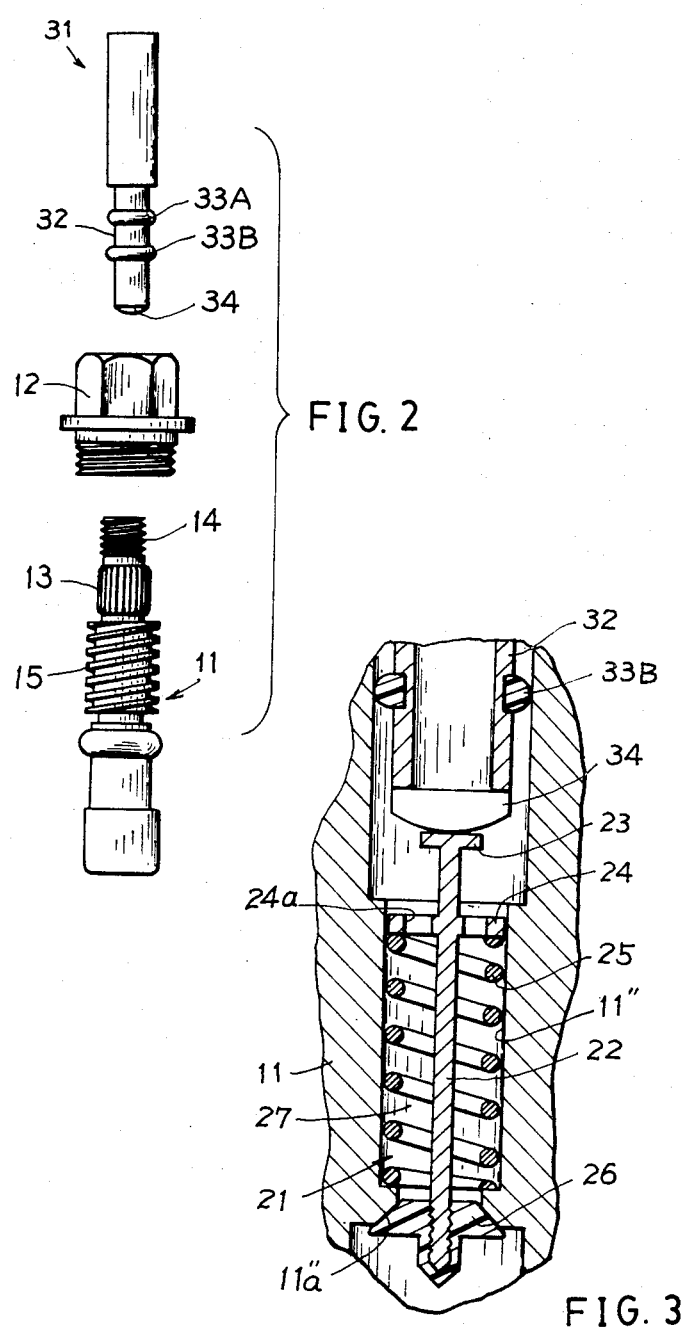

FAUCET WITH BUILT-IN NEEDLE VALVE

BACKGROUND OF THE INVENTION

Conventional faucet serves only for single use and should be connected with water hose for additional spray use. However, such a further connection is quite inconvenient for additional use. For rinsing mouth or teeth, a cup may be used to receive water from conventional faucet and is thus inconvenient in rinsing application.

Conventional dental water spray requires an electric pumping system for filling water into a water container which should be always cared to maintain a full water level for ready spray use and is very inconvenient during dental treatment.

The present inventor has found the defects of conventional faucets or dental water spray systems and invented the present faucet with built-in needle valve.

SUMMARY OF THE INVENTION

The object of the present invention is to provide a faucet including a hollow stem with both ends opened, a needle valve resiliently mounted within the hollow stem and a syringe movably inserted into the hollow stem tube for depressing needle valve for spraying water outwards through the hollow stem provided in a conventional faucet.

BRIEF DESCRIPTION OF THE DRAWINGS

FIG. 2 is a perspective drawing of several parts of the present invention.

FIG. 3 shows partial sectional drawing of the parts of the present invention.

DETAILED DESCRIPTION

Figure 1:
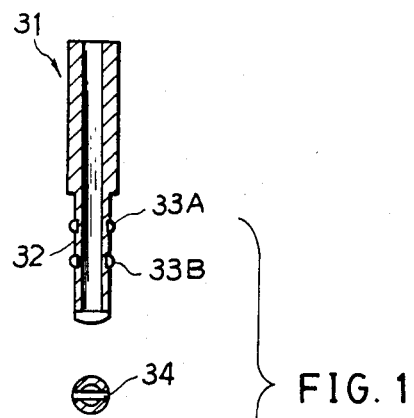
FIG. 1 is a sectional drawing of the present invention.
Figure 1:
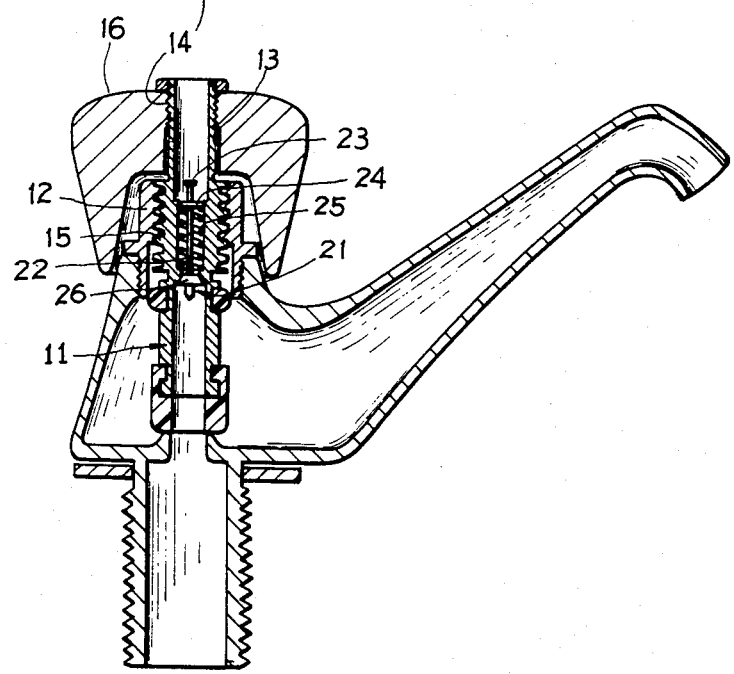

As shown in the figures, the present invention comprises: a hollow stem 11 which is formed with a hollow stem tube 11″ with both ends opened, a needle valve 21 resiliently mounted in hollow tube 11″, and a syringe 31 movably inserted in hollow tube 11″ above needle valve 21.

Needle valve 21 comprises a needle rod 22, an extension tip 23 formed on the uppermost end of rod 22, a perforated spring retainer 24 fixed near the central portion of rod 22 and perforated several holes 24a for water passage, a restoring spring 25 backed by spring retainer 24 and inserted into hollow stem tube 11″, and a tapered rubber plug 26 formed on the lowest end of needle rod 22 and normally sealing the tapered seat 11a″ formed in hollow tube 11″.

Syringe 31 is formed with a hollow adaptor 32 which is movably inserted into hollow tube 11″ and is jacketed with several packing rings 33A, 33B for preventing water leakage from stem 11. A pressing plate 34 is centrally formed on the bottom of syringe adaptor 32. Plate 34 is merely a slim plate to allow water passing into hollow syringe for spray use when syringe 31 is inserted into hollow stem 11 to allow the pressing plate 34 riding atop on the extension tip 23 of rod 22.

The present invention includes a hollow stem 11 which is formed with longitudinal threads 13 and transverse threads 14 for fixing stem handle 16 and is formed with threads 15 for mounting bonnet 12.

When using the present invention for spraying water upwards, the syringe 31 is depressed to press extension tip 23 of needle valve 21 to lower the tapered rubber plug 26 whereby the water will flow upwards through passages 27, passages besides pressing plate 34 of hollow syringe adaptor 32 and finally spray outwards for rinsing use. When it is not used, the syringe 31 is pulled upwards whereby the restored spring 25 will force retainer 24 and needle valve 21 upwards to allow rubber plug 26 sealing the tapered seat 11a″ to stop water spray.

The present invention is superior to conventional faucet with following advantages:

1. The faucet can serve dual uses, i.e., for spraying water upwards directly from the hollow stem and also for normal faucet use by operating the stem wheel as usual, 2. The faucet is constructed in a more economic way but plays double uses as above-mentioned.

I claim:

1. A faucet with built-in needle valve comprising:
    a hollow stem formed with a hollow stem tube with both ends opened;
    a needle valve resiliently mounted in said hollow stem tube; and
    a syringe movably inserted into said hollow stem tube above said needle valve;
  the improvement which comprises:
    said built-in needle valve resiliently mounted in said hollow stem tube of said hollow stem and including a needle rod, an extension tip formed on the uppermost end of said needle rod, a perforated spring retainer formed near the central portion of said needle rod and perforated with several holes thereon for water passage through said holes, a restoring spring backed by said spring retainer and inserted into said hollow stem tube and a tapered rubber plug formed on the lowest end of said needle rod to seal a tapered seat formed in said hollow stem tube; and
    said syringe having a hollow adaptor movably inserted into said hollow stem tube and having a pressing plate which is a slim plate, centrally formed on the bottom of said syringe adaptor,
  whereby when said syringe is inserted in said hollow stem to allow said pressing plate to ride atop said extension tip of said needle rod, the depression of said syringe will lower said tapered rubber plug to to allow the flow of water upwards through said hollow stem, the passage beside said pressing plate and said hollow adaptor for upwards rinsing use.

* * * * *